(12) United States Patent
Barbier et al.

(10) Patent No.: US 11,541,717 B2
(45) Date of Patent: Jan. 3, 2023

(54) HVAC INLET SUBASSEMBLY

(71) Applicant: DENSO International America, Inc., Southfield, MI (US)

(72) Inventors: Eric Barbier, Southfield, MI (US); Brian Belanger, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 421 days.

(21) Appl. No.: 16/818,880

(22) Filed: Mar. 13, 2020

(65) Prior Publication Data

US 2020/0406701 A1 Dec. 31, 2020

Related U.S. Application Data

(60) Provisional application No. 62/866,286, filed on Jun. 25, 2019.

(51) Int. Cl.
| | |
|---|---|
| *B60H 1/24* | (2006.01) |
| *B60H 1/00* | (2006.01) |
| *B60H 3/06* | (2006.01) |
| *B60H 1/26* | (2006.01) |

(52) U.S. Cl.
CPC ......... *B60H 1/00028* (2013.01); *B60H 1/241* (2013.01); *B60H 1/26* (2013.01); *B60H 3/0658* (2013.01); *B60H 2001/00092* (2013.01); *B60H 2001/00185* (2013.01)

(58) Field of Classification Search
CPC ...... B60H 1/00028; B60H 2001/00092; B60H 1/241; B60H 1/26; B60H 3/0658; B60H 1/00849; B60H 1/00592
USPC ................................ 454/152, 155–156, 158
See application file for complete search history.

(56) References Cited

U.S. PATENT DOCUMENTS

| | | | |
|---|---|---|---|
| 6,253,841 B1 * | 7/2001 | Obara | B60H 1/00849 454/145 |
| 9,821,626 B2 * | 11/2017 | Wittmann | B60H 1/24 |
| 2012/0214394 A1 * | 8/2012 | Kanemaru | B60H 1/00678 454/139 |
| 2014/0045417 A1 * | 2/2014 | Sakamoto | B60H 1/00028 454/143 |
| 2016/0144688 A1 * | 5/2016 | Kim | B60H 1/00028 454/143 |
| 2016/0231007 A1 * | 8/2016 | Ha | F24F 1/027 |

FOREIGN PATENT DOCUMENTS

WO   WO-2019138172 A1 *  7/2019  ......... B60H 1/00471

\* cited by examiner

*Primary Examiner* — Ko-Wei Lin
(74) *Attorney, Agent, or Firm* — Harness, Dickey & Pierce, P.L.C.

(57) ABSTRACT

An inlet subassembly for a heating, ventilation, and air conditioning (HVAC) system. The inlet subassembly includes a divider defining a first airflow path and a second airflow path on opposite sides of the divider. The first airflow path extends from a first side of the recirculation air inlet and a first side of the fresh air inlet. The second airflow path extends from a second side of the recirculation air inlet and a second side of the fresh air inlet. A first inlet door is movable to control airflow into the first airflow path from the first side of the recirculation air inlet or the first side of the fresh air inlet. A second inlet door is movable to control airflow into the second airflow path from the second side of the recirculation air inlet or the second side of the fresh air inlet.

10 Claims, 6 Drawing Sheets

HVAC INLET SUBASSEMBLY

CROSS-REFERENCE TO RELATED APPLICATION

This application claims the benefit of U.S. Provisional Patent Application No. 62/866,286 filed on Jun. 25, 2019, the entire disclosure of which is incorporated herein by reference.

FIELD

The present disclosure relates to an inlet subassembly for an HVAC system, such as a dual or two-layer HVAC system.

BACKGROUND

This section provides background information related to the present disclosure, which is not necessarily prior art.

Vehicle heating, ventilation, and air conditioning (HVAC) systems may be configured as dual or two-layer systems. A two-layer system allows for independent airflow management in an upper area and a lower area of a vehicle passenger cabin. Specifically, internal air is recirculated at the lower area of the passenger cabin, and external fresh air is routed through the upper area of the passenger cabin. The recirculated air improves heating efficiency, and the fresh air reduces occurrences of window fogging. While existing two-layer HVAC systems are suitable for their intended use, they are subject to improvement. The present disclosure advantageously provides for an improved inlet subassembly for an HVAC system, such as a two-layer HVAC system.

SUMMARY

This section provides a general summary of the disclosure, and is not a comprehensive disclosure of its full scope or all of its features.

The present disclosure includes an inlet subassembly for a heating, ventilation, and air conditioning (HVAC) system. The inlet subassembly includes a divider defining a first airflow path and a second airflow path on opposite sides of the divider. The first airflow path extends from a first side of the recirculation air inlet and a first side of the fresh air inlet. The second airflow path extends from a second side of the recirculation air inlet and a second side of the fresh air inlet. A first inlet door is movable to control airflow into the first airflow path from the first side of the recirculation air inlet or the first side of the fresh air inlet. A second inlet door is movable to control airflow into the second airflow path from the second side of the recirculation air inlet or the second side of the fresh air inlet.

The present disclosure further includes an inlet subassembly for a heating, ventilation, and air conditioning (HVAC) system. The inlet subassembly has a divider between a first fresh air inlet and a second fresh air inlet, and between a first recirculation air inlet and a second recirculation air inlet. A first inlet door is movable between the first fresh air inlet and the first recirculation air inlet. A second inlet door is movable between the second fresh air inlet and the second recirculation air inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
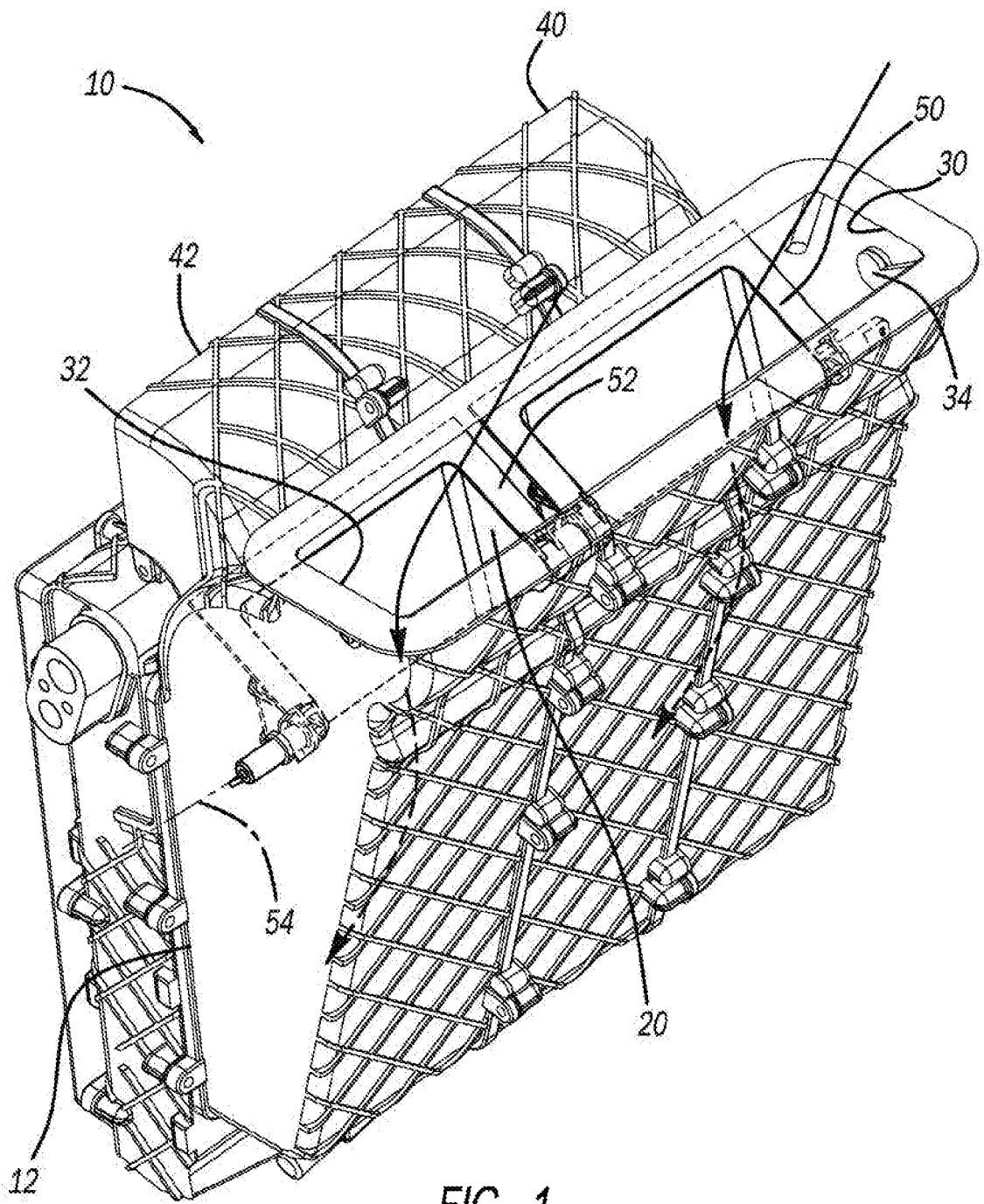
FIG. 1 is a perspective view of a heating, ventilation, and air conditioning (HVAC) system inlet subassembly in accordance with the present disclosure.
Figure 5:
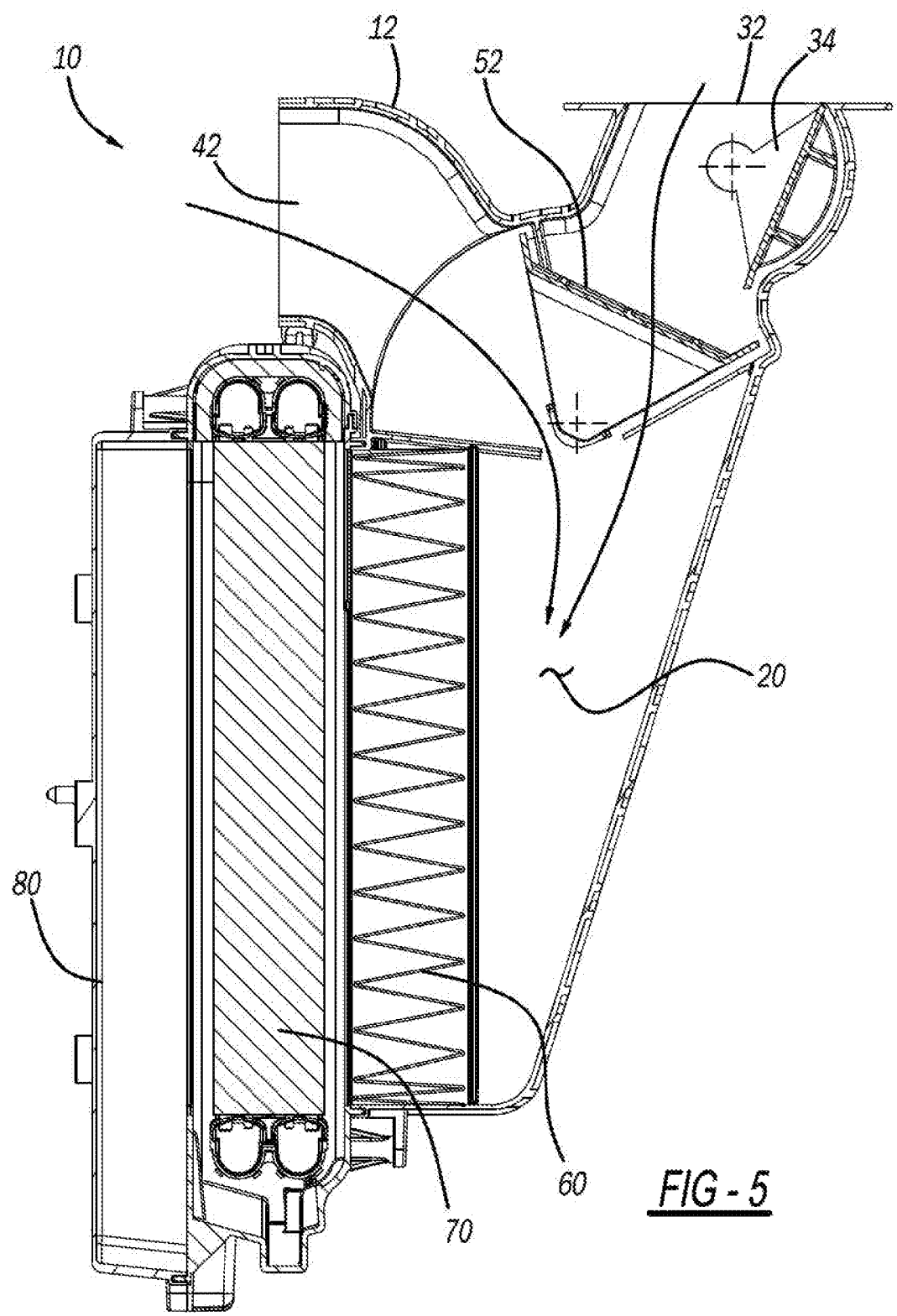
Figure 6:
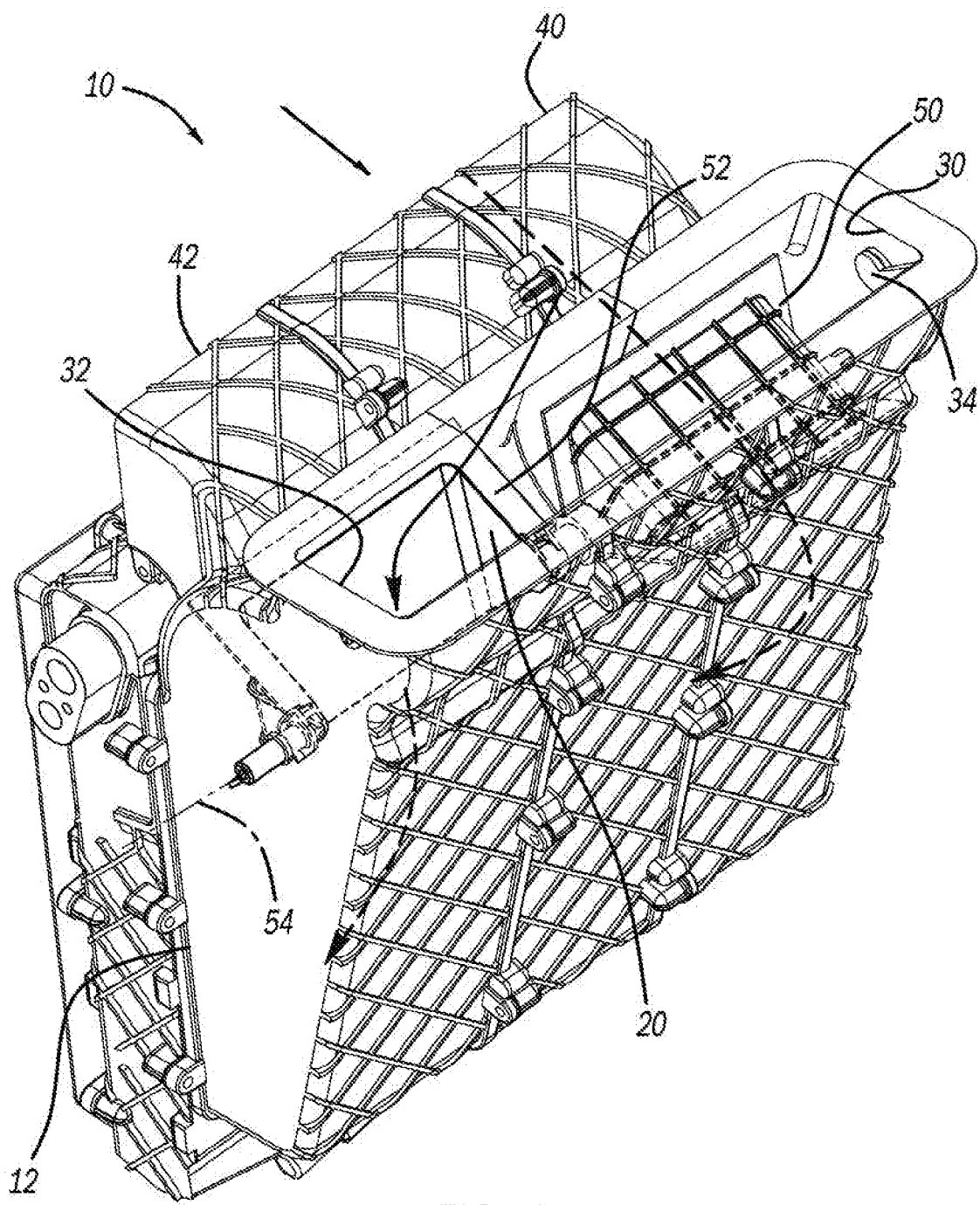

FIG. 5 is a cross-sectional view of the inlet subassembly of FIG. 1 with the airflow control door arranged in a recirculation position and the RAM Air door in the retracted position; and FIG. 6 is a cross-sectional view of the inlet subassembly of FIG. 1 in a two-layer mode in which the airflow control door is in the fresh air position, and another airflow control door is in the recirculation position.

Corresponding reference numerals indicate corresponding parts throughout the several views of the drawings.

DETAILED DESCRIPTION

Example embodiments will now be described more fully with reference to the accompanying drawings.

Figure 2:
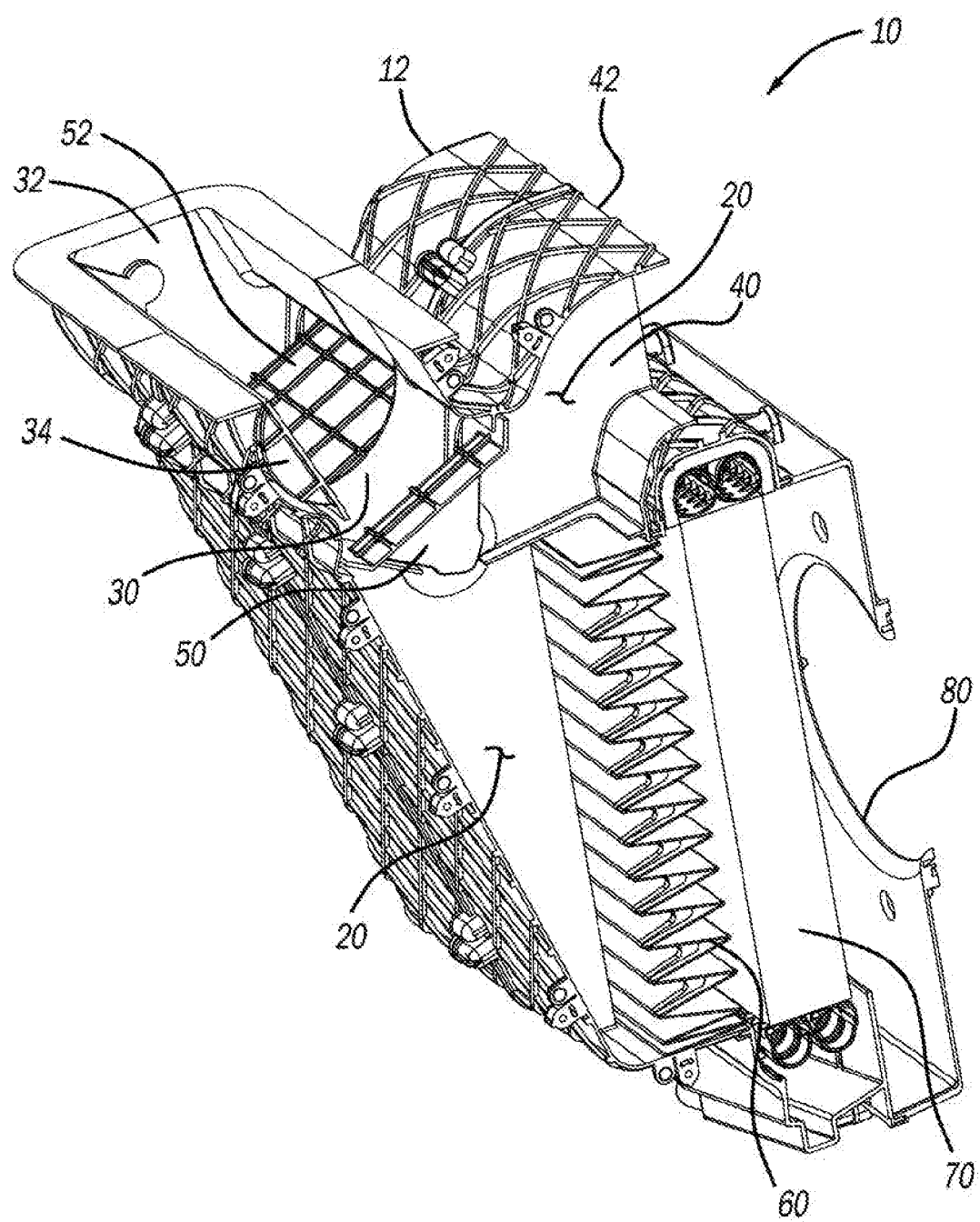
FIG. 2 is a cross-sectional view of the inlet subassembly of FIG. 1.
Figure 3:
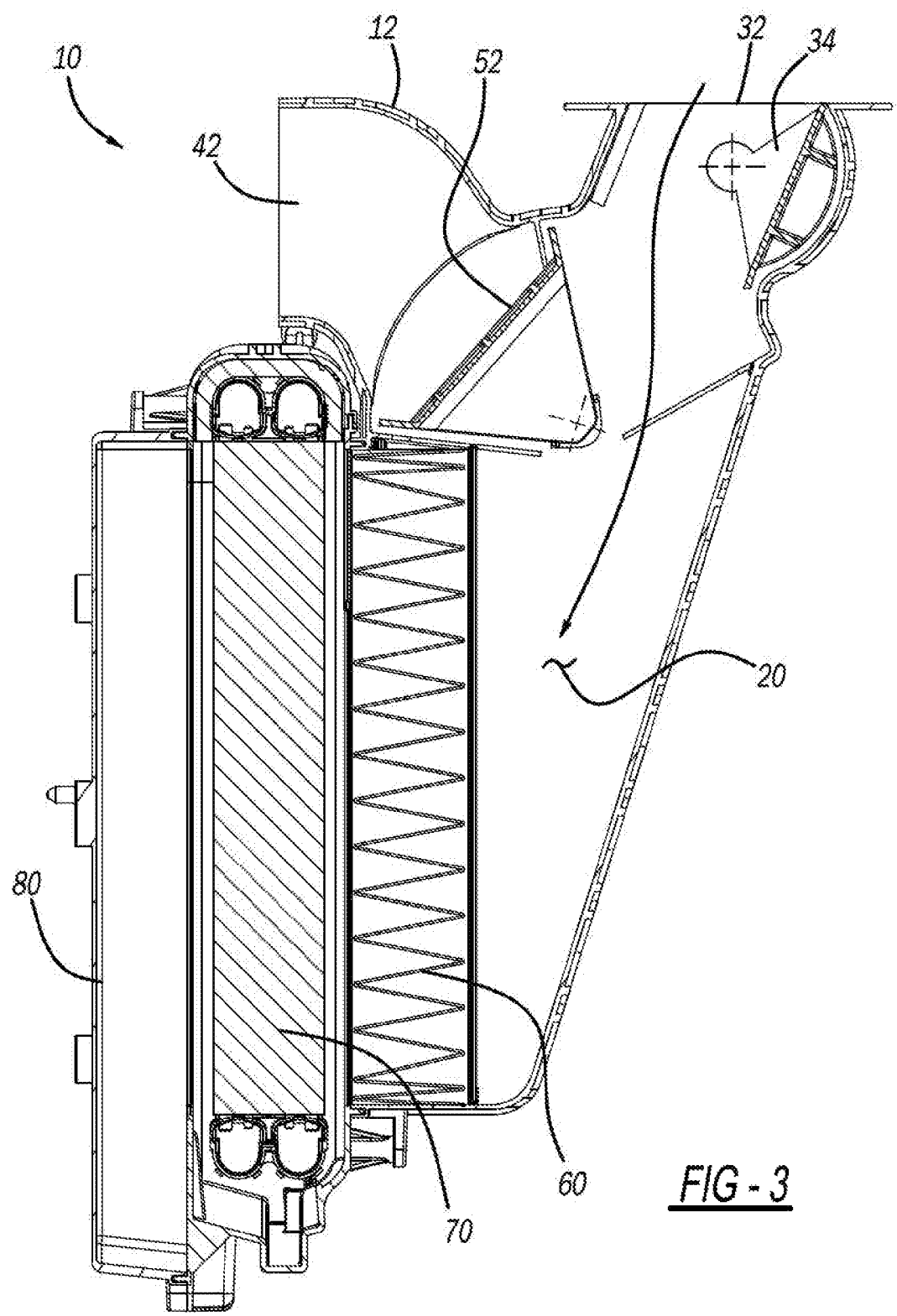
FIG. 3 is a cross-sectional view of the inlet subassembly of FIG. 1 with an airflow control door arranged in a fresh air position and a RAM air door in a retracted position.

FIGS. 1, 2, and 3 illustrate an exemplary inlet subassembly 10 in accordance with the present disclosure. The inlet subassembly 10 is configured for use with any suitable heating, ventilation, and air conditioning (HVAC) system, such as a vehicle HVAC system. The vehicle HVAC system may be configured for use with any suitable vehicle, such as any suitable passenger vehicle, mass transit vehicle, recreational vehicle, utility vehicle, construction vehicle/equipment, military vehicle/equipment, watercraft, aircraft, etc. The inlet subassembly 10 may also be configured for use with any suitable non-vehicular application, such as a building HVAC system.

The inlet subassembly 10 includes a housing 12. Within the housing 12 is a divider 20. The divider 20 defines a first airflow path on a first side of the divider 20, and a second airflow path on a second side of the divider 20. The first and second airflow paths are independent of one another such that airflow does not mix between the two paths. As explained herein, the divider 20 provides the inlet subassembly 10 with two-layer functionality whereby fresh airflow is circulated throughout an upper portion of a passenger cabin of a vehicle in which the inlet subassembly 10 is installed in to reduce window fogging, and recirculated airflow is circulated throughout a lower portion of the passenger cabin to decrease vehicle warmup time and conserve energy.

The housing 12 defines a plurality of airflow inlets and outlets. Specifically, the housing 12 defines a first fresh air inlet 30 and a second fresh air inlet 32. The first and second fresh air inlets 30, 32 are separated by the divider 20 of the housing 12. The first and second fresh air inlets 30, 32 receive fresh air from an exterior of the vehicle. Thus, fresh air from the exterior of the vehicle enters the inlet subassembly 10 through the first and second fresh air inlets 30 and 32.

Figure 4:
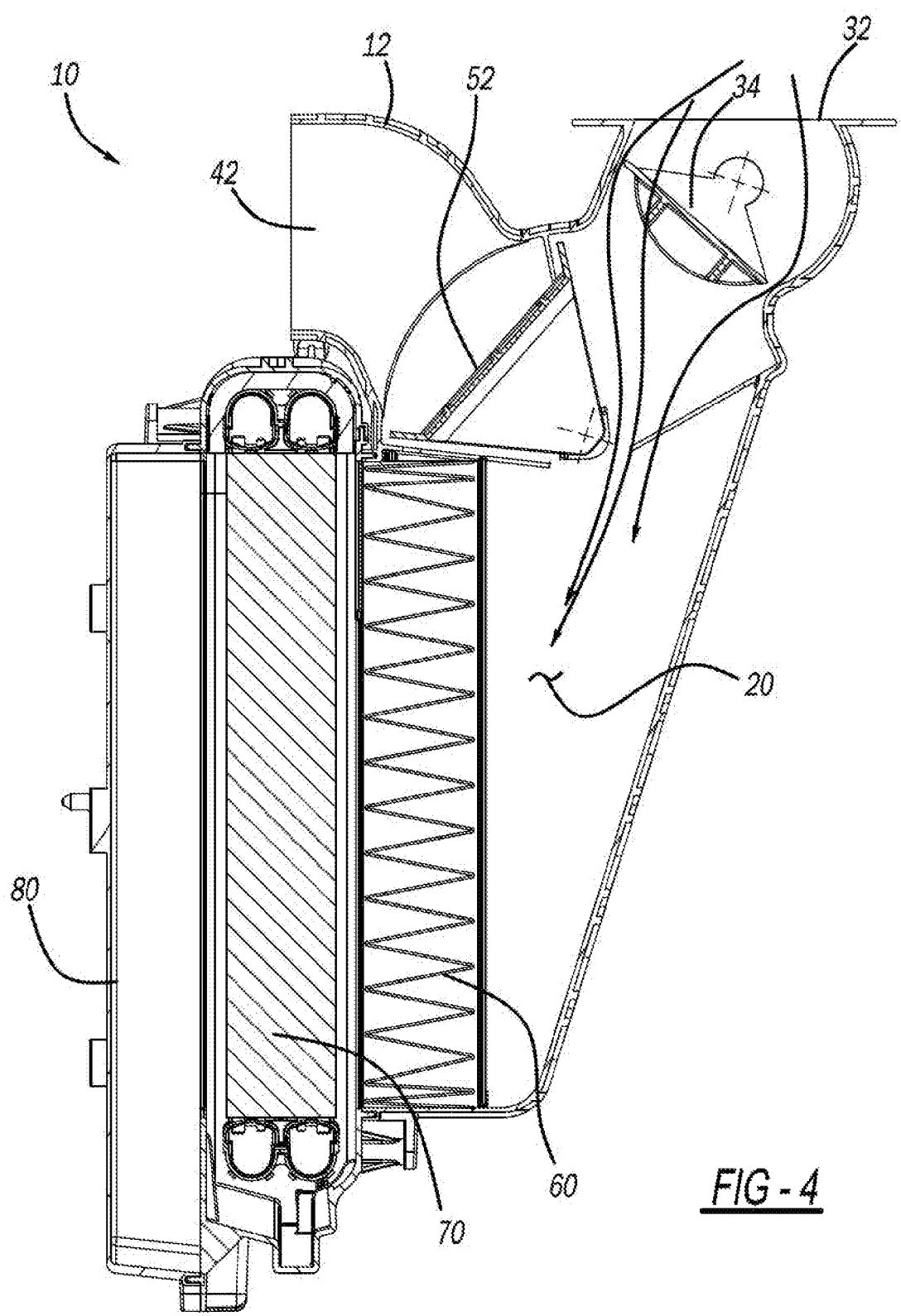
FIG. 4 is a cross-sectional view of the inlet subassembly of FIG. 1 with the airflow control door arranged in the fresh air position and the RAM air door in a deployed position.

An optional RAM air door 34 may be included. When the RAM air door 34 is deployed, as illustrated in FIG. 4, the RAM air door 34 reduces the rate at which fresh airflow enters the inlet subassembly 10 through both the first and second fresh air inlets 30 and 32, particularly when the vehicle including the inlet subassembly 10 is traveling at a high rate of speed. In the example illustrated, the RAM air door 34 is a rotary door extending across both of the first and second fresh air inlets 30 and 32. The RAM air door 34 may be any other suitable airflow control member, door, or plurality of doors. For example, the RAM air door 34 may be two separate doors, with one RAM air door being at the first fresh air inlet 30 and another RAM air door being at the second fresh air inlet 32.

The housing 12 further defines one or more recirculation air inlets. In the example illustrated, the housing 12 defines a first recirculation air inlet 40 and a second recirculation air inlet 42, which are arranged side-by-side and separated by the divider 20. The first and second recirculation air inlets 40 and 42 are arranged to receive recirculated air from the passenger cabin of the vehicle.

The divider 20 is between the first fresh air inlet 30 and the second fresh air inlet 32, and is between the first recirculation air inlet 40 and the second recirculation air inlet 42. Thus, the divider 20 defines the first airflow path extending from both the first fresh air inlet 30 and the first recirculation air inlet 40 to and through a filter 60 and an evaporator 70 of the inlet subassembly 10. The divider 20 also defines the second airflow path extending from both the second fresh air inlet 32 and the second recirculation air inlet 42 to and through the filter 60 and the evaporator 70. To keep airflow of the first airflow path separate from airflow of the second airflow path, the divider 20 may extend through the filter 60 and the evaporator 70, or any other suitable partition may be included to prevent mixing of airflow between the first and second airflow paths at the filter 60, at the evaporator 70, and at an outlet 80. Airflow exits the inlet subassembly 10 through the outlet 80 to any suitable two-layer HVAC blower, which draws airflow into any suitable two-layer HVAC heater case configured to heat airflow and distribute the airflow to particular areas of the passenger cabin.

The inlet subassembly 10 further includes a first inlet door 50 and a second inlet door 52. The first and second inlet doors 50 and 52 are positioned at any suitable location to control airflow into the inlet subassembly 10 through the first and second fresh air inlets 30, 32 and the first and second recirculation air inlets 40, 42. For example and as illustrated throughout the drawings, the first inlet door 50 is generally at a junction between the first fresh air inlet 30 and the first recirculation air inlet 40. The second inlet door 52 is at a junction between the second fresh air inlet 32 and the second recirculation air inlet 42. The first inlet door 50 and the second inlet door 52 are on opposite sides of the divider 20. The first and second inlet doors 50 and 52 may be any suitable airflow control members, such as rotary doors as illustrated. The first and second inlet doors 50 and 52 may be rotated together to the same position or individually to different positions by any suitable rotation device, such as a servo. The first and second inlet doors 50 and 52 may share a common rotation axis 54 as illustrated. The rotation axis 54 extends through, and perpendicular to, the divider 20.

With particular reference to FIGS. 3-6, various modes of the inlet subassembly 10 and various positions of the first and second inlet doors 50 and 52 will now be described. With particular reference to FIG. 3, the second inlet door 52 is illustrated in a fresh air mode position whereby the second inlet door 52 permits fresh airflow into the inlet subassembly 10 through the second fresh air inlet 32, and blocks recirculation airflow from entering the inlet subassembly 10 through the second recirculation air inlet 42. The first inlet door 50 may be arranged in the same position as the second inlet door 52 to allow fresh airflow into the inlet subassembly 10 through the first fresh air inlet 30, and block recirculation airflow from entering through the first recirculation air inlet 40. The RAM air door 34 is arranged in the retracted position so as to not obstruct fresh air from flowing into the inlet subassembly 10. With reference to FIG. 4, the RAM air door 34 may be deployed to slow the rate at which fresh air flows into the inlet subassembly 10 when the vehicle including the inlet subassembly 10 is traveling at a high rate of speed.

FIG. 5 illustrates the second inlet door 52 rotated to a recirculation mode position. In the recirculation mode position, the second inlet door 52 permits airflow into the inlet subassembly 10 through the second recirculation air inlet 42, and blocks fresh airflow into the inlet subassembly 10 through the second fresh air inlet 32. The first inlet door 50 may be arranged in the same position so as to allow recirculated airflow in through the first recirculation air inlet 40, and block fresh air from flowing in through the first fresh air inlet 30.

With reference to FIG. 6, the first and second inlet doors 50 and 52 may be arranged at different positions relative to one another to provide two-layer airflow within the vehicle passenger cabin. In the example illustrated, the first inlet door 50 is in the recirculation mode position whereby the first inlet door 50 prevents fresh air from flowing into the inlet subassembly 10 through the first fresh air inlet 30, and allows recirculated airflow to enter the inlet subassembly 10 through the first recirculation air inlet 40. The second inlet door 52 is arranged in the fresh air mode position to allow fresh air to flow into the inlet subassembly 10 through the second fresh air inlet 32, and block recirculated air from entering through the second recirculation air inlet 42. The divider 20 prevents the fresh air from mixing with the recirculated air.

In the two-layer mode of FIG. 6, the recirculated airflow is directed through the filter 60 and the evaporator 70, and out of the inlet subassembly 10 through the outlet 80. From the outlet 80 the recirculated airflow passes through any suitable blower or heater case connected to the inlet subassembly 10, and is directed to a lower portion of the passenger cabin. The fresh airflow is directed through the filter 60 and the evaporator 70, out of the inlet subassembly 10 through the outlet 80. From the outlet 80, the fresh airflow is directed through the blower and heater case, which maintain the fresh air separate from the recirculated air, and to the upper portion of the passenger cabin.

The present disclosure thus provides for an improved inlet subassembly 10 for controlling fresh and recirculated airflow into any suitable two-layer blower and heater case of an HVAC system. The inlet subassembly 10 advantageously provides for a compact subassembly that controls fresh and recirculated airflow into an HVAC system in both single layer and two-layer airflow modes. The inlet subassembly 10 defines two separate airflow paths and prevents airflow in the two paths from mixing. Further, the inlet subassembly 10 prevents fresh airflow from exiting through recirculation inlets 40 and 42, and prevents recirculation airflow from exiting through fresh air inlets 30 and 32. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An inlet subassembly for a heating, ventilation, and air conditioning (HVAC) system, the inlet subassembly comprising:
   a recirculation air inlet;
   a fresh air inlet;
   a divider defining a first airflow path and a second airflow path on opposite sides of the divider, the first airflow path extending from a first side of the recirculation air inlet and a first side of the fresh air inlet, and the second airflow path extending from a second side of the recirculation air inlet and a second side of the fresh air inlet;
   a first inlet door movable to control airflow into the first airflow path from the first side of the recirculation air inlet or the first side of the fresh air inlet; and
   a second inlet door movable to control airflow into the second airflow path from the second side of the recirculation air inlet or the second side of the fresh air inlet.

2. The inlet subassembly of claim 1, wherein the divider extends perpendicular to a rotation axis of the first inlet door and a rotation axis of the second inlet door.

3. The inlet subassembly of claim 1, wherein the first inlet door and the second inlet door are rotatable about a common rotation axis.

4. The inlet subassembly of claim 1, wherein the divider separates recirculation airflow entering the inlet subassembly through the recirculation air inlet from fresh airflow entering the inlet subassembly through the fresh air inlet.

5. The inlet subassembly of claim 1, wherein the first inlet door is movable independent of the second inlet door.

6. The inlet subassembly of claim 1, wherein the first inlet door and the second inlet door are both movable between the recirculation air inlet and the fresh air inlet.

7. The inlet subassembly of claim 1, wherein the first inlet door and the second inlet door are both rotary doors.

8. The inlet subassembly of claim 1, further comprising a RAM air door at the fresh air inlet upstream of the first inlet door and the second inlet door.

9. The inlet subassembly of claim 1, further comprising a filter and an evaporator configured to receive airflow from the first airflow path and the second airflow path.

10. The inlet subassembly of claim 1, wherein:
   the first inlet door and the second inlet door are movable to a fresh air mode position permitting fresh airflow to enter the inlet subassembly through the fresh air inlet and blocking recirculation airflow from entering the inlet subassembly through the recirculation air inlet;
   the first inlet door and the second inlet door are movable to a recirculation air mode position permitting recirculation airflow to enter the inlet subassembly through the recirculation air inlet and blocking fresh airflow from entering the inlet subassembly through the fresh air inlet; and the first inlet door and the second inlet door are movable to a two-layer mode position in which the first inlet door blocks fresh airflow from entering the first airflow path through the fresh air inlet and permits recirculation airflow to enter the first airflow path through the recirculation air inlet, and the second inlet door blocks recirculation airflow from entering the second airflow path through the recirculation air inlet and permits fresh airflow to enter the second airflow path through the fresh air inlet.

\* \* \* \* \*